(No Model.)
A. H. MICHAELIS.
TOOTH OR PRONG FOR HORSE HAY RAKES.
No. 363,665. Patented May 24, 1887.
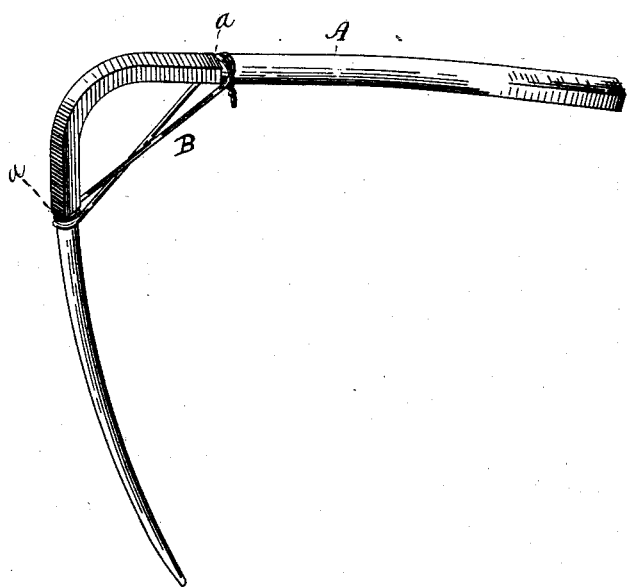
Witnesses
G. A. Tautkirschmidt
Wm H. Bates, Jr
Inventor
August H. Michaelis
By his Attorney Wm H. Bates

United States Patent Office.

AUGUST H. MICHAELIS, OF BUCYRUS, OHIO.

TOOTH OR PRONG FOR HORSE HAY-RAKES.

SPECIFICATION forming part of Letters Patent No. 363,665, dated May 24, 1887.

Application filed February 23, 1887. Serial No. 228,506. (No model.)

*To all whom it may concern:*

Be it known that I, AUGUST H. MICHAELIS, a citizen of the United States, residing at Bucyrus, in the county of Crawford and State of Ohio, have invented certain new and useful Improvements in Teeth or Prongs for Horse Hay-Rakes; and I do hereby declare the following to be a full, clear, and exact description of the invention, such as will enable others skilled in the art to which it appertains to make and use the same.

This invention relates to that class of rake-teeth which are designed for horse hay and other similar rakes which are adapted for raking up or gathering hay in the field; and the object thereof is to produce a light, strong, durable, and inexpensive tooth or prong which will readily take up and retain therein the hay from the field preparatory to depositing it wherever it may be desired.

To this end the invention consists in the novel construction and combination of parts, as will be hereinafter more particularly described, and specifically pointed out in the claims.

In the accompanying drawing, to which reference is had, and which fully illustrates my invention, the figure herein represents my improved rake prong or tooth constructed according to my invention.

The letter A represents a tooth or prong constructed of one piece of wood or other suitable material and in the form of an acute angle, which is provided with shoulders *a a* near the apex of the angle, against which a single strand of wire is wrapped or coiled around each side of the bend or apex of the angle and crossed in carrying it from one angle to the other, thus forming a strong and durable brace, B. The wire, where it is coiled around the tooth or prong at each side of the bend or apex of the angle, rests snugly against the shoulders, which serve to prevent its slipping, after it is securely fastened, by twisting the ends of the wire at one side of the angle of the prong. It will thus be seen that any tendency whatever of the wire or brace slipping from its position and allowing the tooth or prong to spring back out of said position is entirely obviated. By thus bracing the apex of the angle of the prong in the manner described it will be obvious that great strength is given to the tooth or prong at this point, where it is mostly needed and where the greatest strain is brought to bear upon the tooth, and where it would likely be most liable to break the prong if the rake, in its use, should meet with any heavy or fixed obstacle in the field, or any load of hay which should be extremely heavy, which the operator may have occasion to raise with the rake while raking the hay from the field.

From the foregoing description it will also be obvious that the brace can be applied very quickly and with but very little trouble and expenditure of time and labor, as there are no nails or screws required for fastening it to the prong or tooth, which is a very important as well as convenient method of bracing the prong. The shoulders upon the prong prevent, beyond any possibility, the brace so slipping or becoming disengaged from the prong as to admit of the springing back out of position, as before mentioned.

Having thus fully described my invention, what I claim as new, and desire to secure by Letters Patent, is—

The combination, with the bent tooth or prong constructed of one piece of wood or other suitable material, as herein described, and having shoulders on each side of the bend therein, of the wire bracing, formed of one piece or strand of wire coiled around the tooth or prong each side of the apex of the angle or bend and fitting snugly against shoulders upon the prong and crossed in the center thereof, resembling in form the letter X, and securely fastened at one side or angle of the tooth or prong, substantially as and for the purpose set forth.

In testimony whereof I affix my signature in presence of two witnesses.

AUGUST H. MICHAELIS.

Witnesses:
 JOHN GRAINGER,
 WM. PFLEIDERER.